United States Patent [19]

Littleton

[11] Patent Number: 4,969,811
[45] Date of Patent: Nov. 13, 1990

[54] APPARATUS FOR MAKING PLASTIC DEVICES

[75] Inventor: Harry E. Littleton, Birmingham, Ala.

[73] Assignee: C & L Plastics, Inc., Birmingham, Ala.

[21] Appl. No.: 362,809

[22] Filed: Jun. 7, 1989

[51] Int. Cl.⁵ .................... B29C 45/14; B29C 45/33
[52] U.S. Cl. .................................. 425/116; 249/64;
    249/91; 249/95; 249/170; 249/177; 425/442;
    425/457; 425/577; 425/588
[58] Field of Search ............... 425/116, 117, 577, 588,
    425/438, 441, 443, 442, 453, 457, 589, DIG. 10;
    249/57, 63, 64, 66 R, 91, 95, 161, 162, 170, 177

[56] References Cited

U.S. PATENT DOCUMENTS

| | | | |
|---|---|---|---|
| 2,643,418 | 6/1953 | Auldridge | 249/95 |
| 3,551,956 | 1/1971 | Rosier | 249/95 |
| 4,077,760 | 3/1978 | Sauer | 425/577 |
| 4,161,837 | 7/1979 | Johnston | 249/95 |
| 4,381,908 | 5/1983 | Roth | 249/91 |
| 4,440,377 | 4/1984 | Hujik | 249/170 |
| 4,514,356 | 4/1985 | Harrison | 425/577 |
| 4,647,419 | 3/1987 | Helfer et al. | 249/64 |
| 4,732,726 | 3/1988 | Granner, III | 425/588 |
| 4,769,198 | 9/1988 | Bechtold et al. | 425/588 |
| 4,779,835 | 10/1988 | Fukushima et al. | 425/588 |
| 4,781,573 | 11/1988 | Depreter | 425/577 |

FOREIGN PATENT DOCUMENTS

| | | | |
|---|---|---|---|
| 202341 | 3/1959 | Fed. Rep. of Germany | 425/572 |
| 211037 | 9/1960 | Fed. Rep. of Germany | 425/577 |

Primary Examiner—Jay H. Woo
Assistant Examiner—Khanh P. Nguyen
Attorney, Agent, or Firm—Jennings, Carter, Thompson & Veal

[57] ABSTRACT

An apparatus for injection molding of plastic lure skirts utilizes an openable mold wherein a conic cavity is formed between a pair of mold plates and a conic insert is selectively advanced to abut the inner surface of the conic cavity. A plurality of grooves are formed in the conic cavity which communicates with a tubular section wherein the soft plastic is introduced such that a body portion and a stranded skirt are formed when plastic is injected between the mold plates and the conic insert. The apparatus may be used for forming double skirted lures or conventional non-skirted lures by internal injection when a stripper bar is used to partially seal the mold distribution channel.

14 Claims, 5 Drawing Sheets

Fig. 3
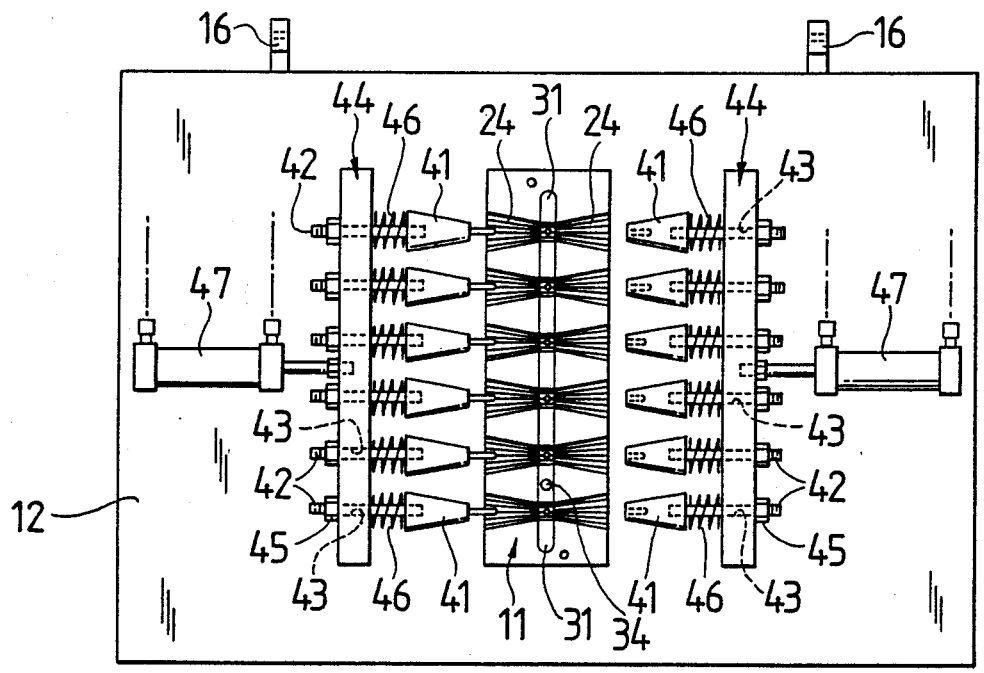
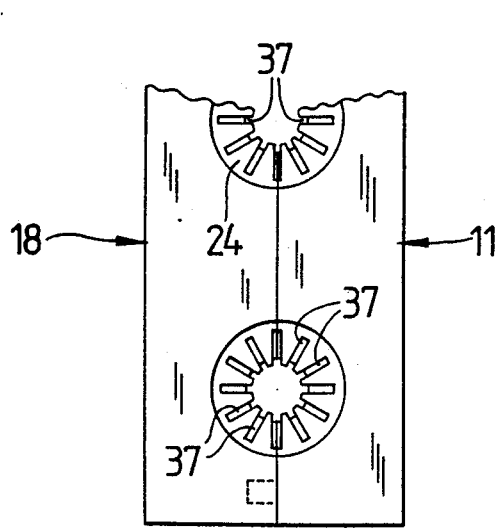
Fig. 7
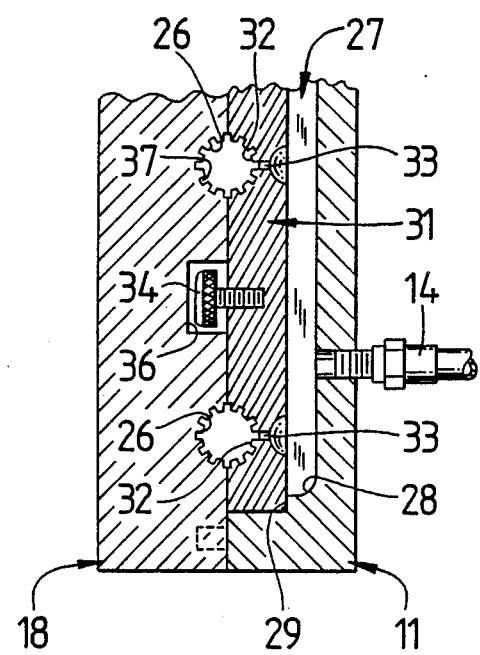
Fig. 8

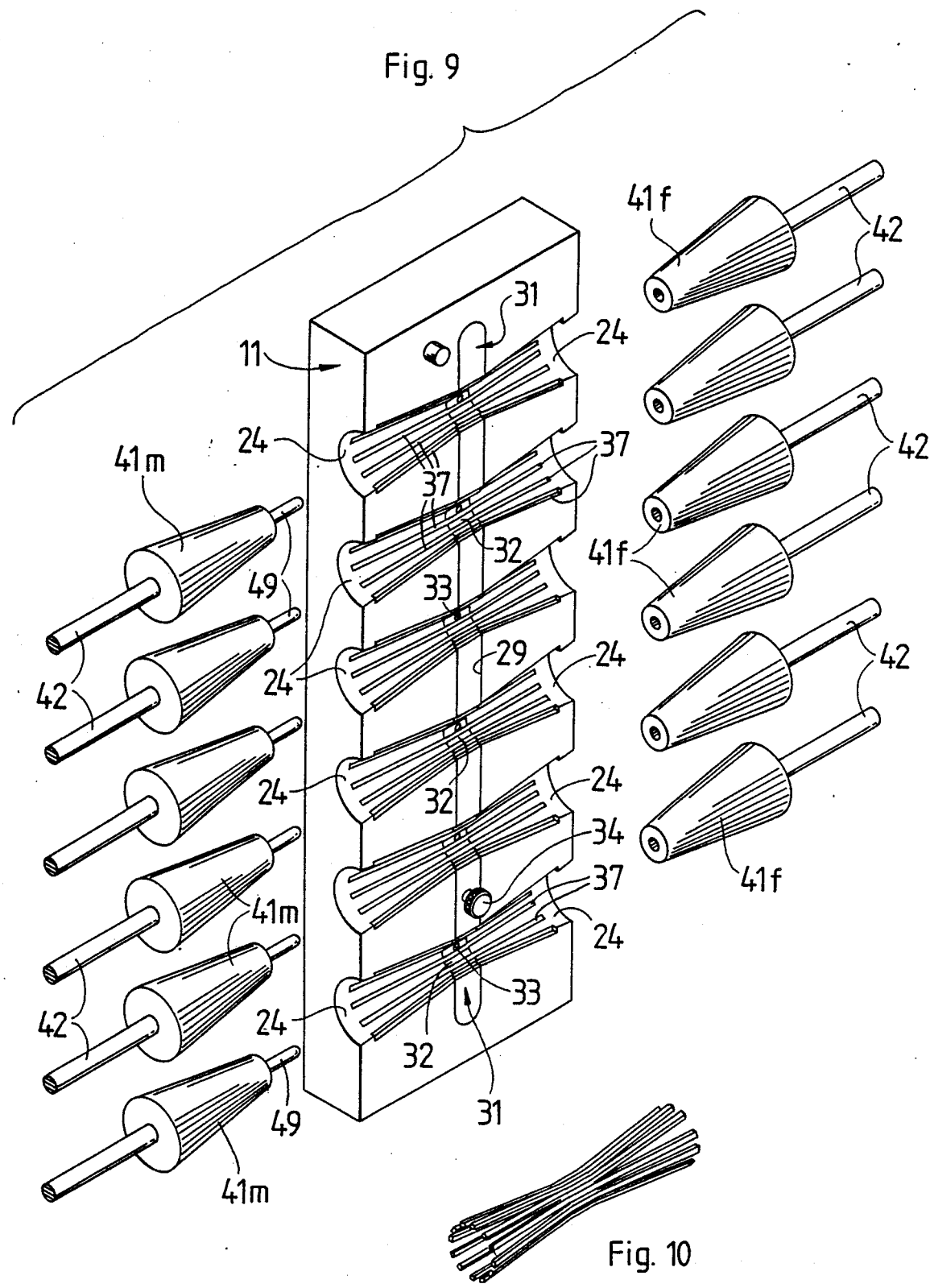

APPARATUS FOR MAKING PLASTIC DEVICES

FIELD OF THE INVENTION

The present invention relates to injection molding of plastics and more particularly to injection molding of plastic products utilized as fishing lures. In even greater particularity, the present invention relates to soft plastic products such as worms, grubs and spinner bait skirts made by an injection molding press.

BACKGROUND OF THE INVENTION

Evolution of fishing lures has progressed from the hand crafted flies tied by fishermen and the hand carved lures carved from wood to high production rate plastic and metal lures. One of the most reliable and most versatile lures is the plastic worm and another type lure that has gained widespread acceptance is the spinner bait. As these lures have evolved, the ability of the artisan to make high production rate replications which have life-like or otherwise enticing features has also improved. In the utilization of spinner baits a skirt is often employed which has a plurality of strands emanating from a band about a leaded hook or jig portion. When first introduced, these skirts were made from sheets of rubber that had been cut into narrow strips and bonded to the jig. Recently, the skirts have been made from tubular plastic which has had one end dipped in molten plastic and the other end cut into strips using a knife. Obviously, cutting the material into small strips, i..e. less than ⅛ inch wide strips, is a time consuming and labor intensive task when manually accomplished. Therefore, it was determined that the most economical way to make a similar product would be to inject molten plastic into a mandrel which had grooves therein, thus forming the strands in the grooves. The present inventor tried this unsuccessfully. The plastic strands did not readily disengage from the grooves. Accordingly, a need was perceived to make plastic lures of this type economically and rapidly.

SUMMARY OF THE INVENTION

It is an object of the present invention to provide a fast and economical means for manufacturing soft plastic articles.

Yet another object of the invention is to manufacture stranded skirts for use in fishing lures by an injection process.

Still another object of the invention is to provide a means for selective coloration of the plastic lures.

These and further objects of the invention are accomplished using my novel mold structure and technique wherein the strands of the skirt are individually formed in individual mold grooves concomitantly with the formation of the body of the skirt, thereby eliminating any manual or machine slitting of the skirt. To accomplish this, I use a unique mold which includes a stationary mold plate through which the liquid plastic is injected and in which one half of the mold cavity is formed and a movable mold plate hingedly connected to the stationary mold and in which the other half of the mold cavity is formed. The mold cavity for a plastic skirt is a substantially conic cavity that opens laterally of the closed mold plates and receives liquid plastic from a source thereof in a somewhat cylindrical portion communicating with the conic cavity. A cone member is insertable into the conic cavity of each mold and seals the cavity laterally. A plurality of annularly spaced grooves are formed in the surface of the conic cavity and communicate with the cylindrical portion such that liquid plastic flows from the cylindrical portion into the grooves, thus forming a skirt of plastic strands.

In another embodiment, I utilize a distribution channel intersecting a plurality of mold cavities intermediate the end portions thereof and use a stripper bar having a plurality of spaced apertures therein to control the flow of liquid plastic from the distribution channel to the molds. Utilizing such an arrangement allows me to form double skirts and to create various other shapes and colors which cannot be readily formed by injection from one end of a mold.

BRIEF DESCRIPTION OF THE DRAWINGS

Apparatus embodying features of my invention are depicted in the accompanying drawings which form a portion of this disclosure and wherein:

FIG. 3 is an elevational view taken along line 3—3 of FIG. 1 showing the stationary mold plate;

FIG. 7 is a side elevational view taken along line 7—7 of FIG. 4;

FIG. 8 is a sectional view taken along line 8—8 of FIG. 4;

FIG. 9 is a partial perspective view of the stationary mold plate and conic members;

FIG. 10 is a perspective view of the double skirted product;

DESCRIPTION OF THE PREFERRED EMBODIMENTS

Figure 1:
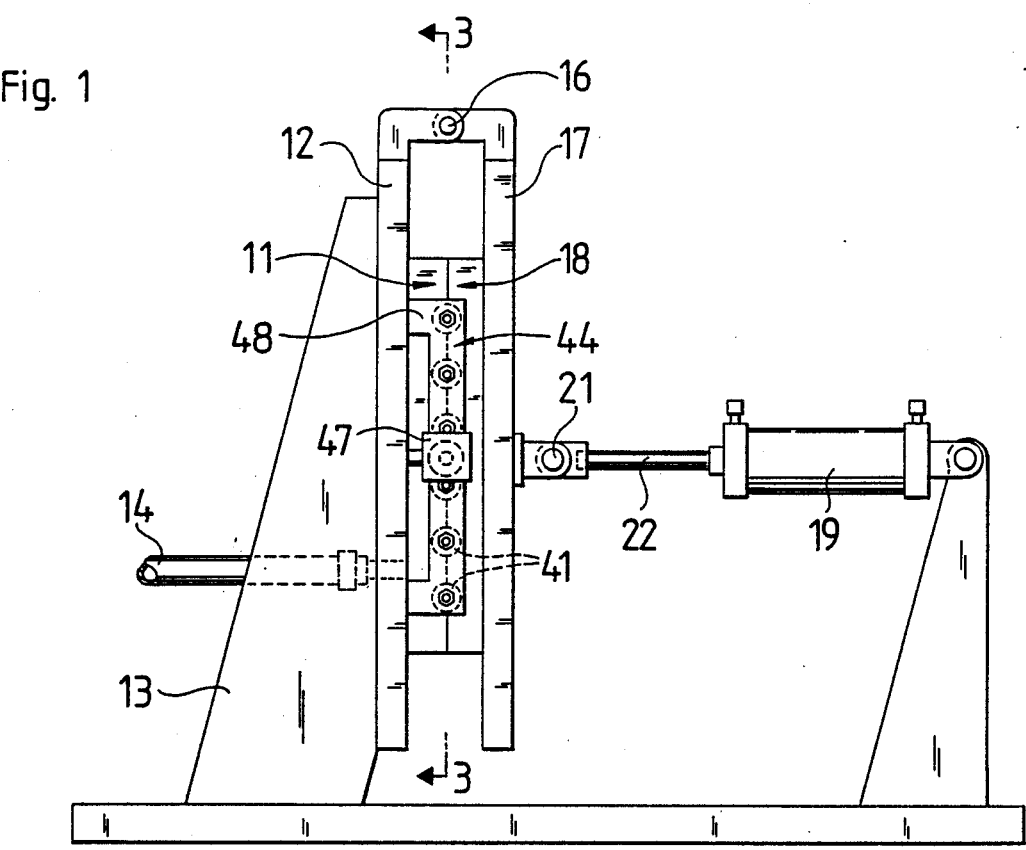
FIG. 1 is a side elevational view of a mold apparatus employing my invention with the source of liquid plastic not shown.
Figure 2:
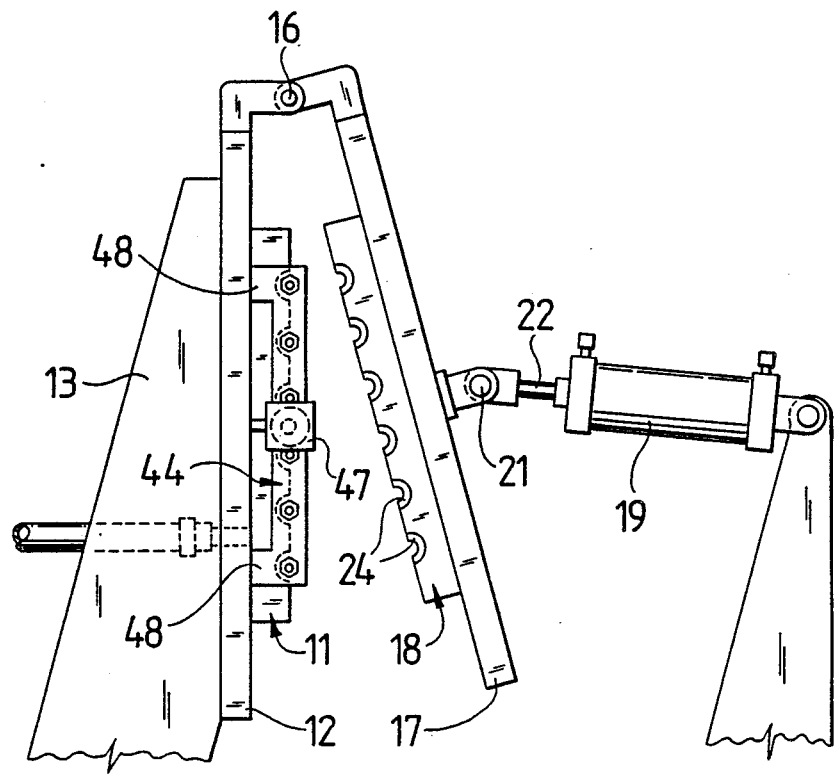
FIG. 2 is a side elevational view of the apparatus of FIG. 1 in a mold open position.

Referring to the drawings for a clearer understanding of the invention, it may be seen in FIGS. 1 and 2 that the apparatus employed is an upright mold apparatus having a stationary mold plate 11 mounted on a mold support 12 supported on a mount 13. A conduit 14 of an appropriate size connects a source (not shown) of liquid plastic to the mold plate through the mount 13 and support 12. The support 12 carries a hinge member 16 at the top thereof which is a precisely aligned hinge and which supports a movable mold support 17 which carries a movable mold plate 18. The hinge member 16 must assure that the mold plates 11 and 18 register properly when in the closed position shown in FIG. 1 and permit repeated retraction to the open position shown in FIG. 2. As shown in FIGS. 1 and 2, the movable support 17 is cooperatively attached to a linear actuator 19 which selectively opens and closes the mold apparatus. The connection may take the form of a pin and clevis connection 21 to a piston rod 22 extending from the actuator 19 or any other convenient connection.

Figure 4:
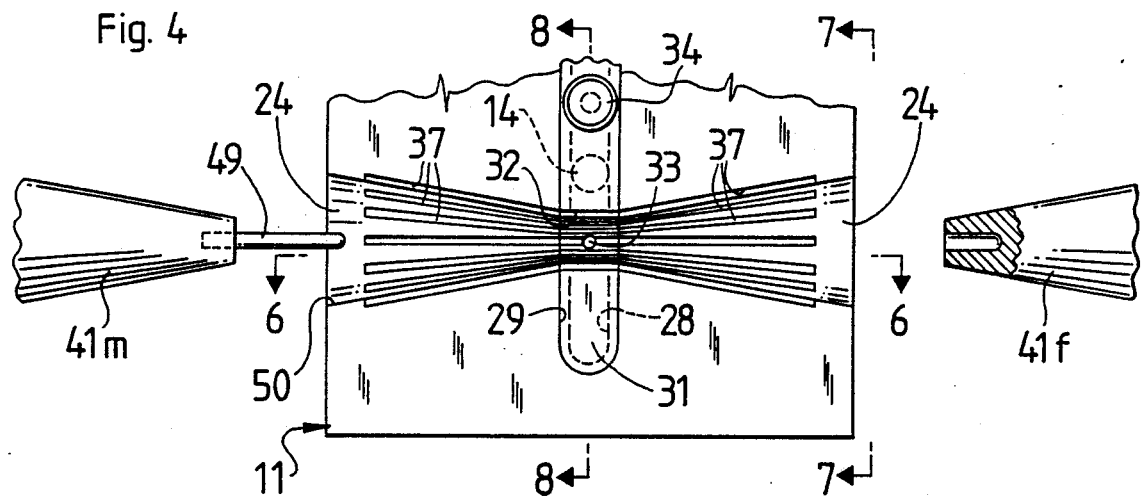
FIG. 4 is a detailed view of the lower portion of the mold plate with the cone members retracted and shown partially in section.
Figure 5:
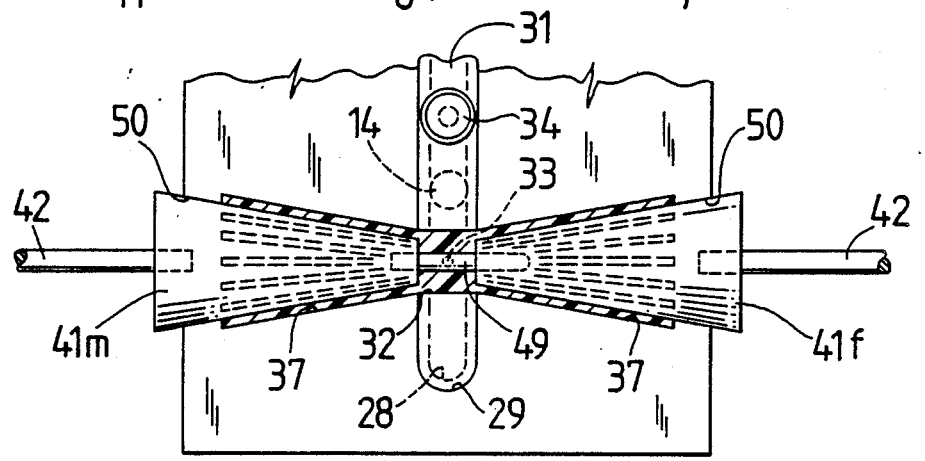
FIG. 5 is a detailed view as in FIG. 4 with the cone member inserted.
Figure 6:
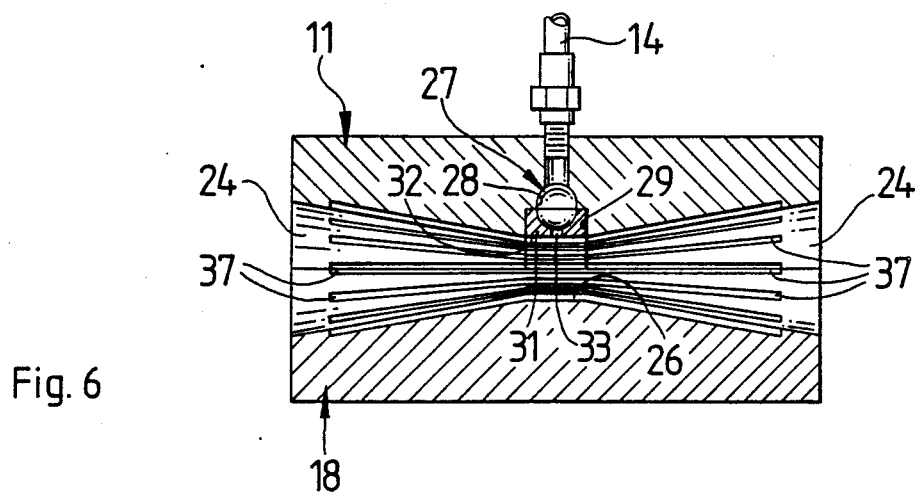
FIG. 6 is a sectional view taken along line 6—6 of FIG. 4 with the mold plates closed.

In FIG. 3, it may be seen that the stationary mold plate 11 has formed therein a plurality of mold cavities 24 which in the illustrated embodiment, are semi-conic mold cavities, which mate with like mold cavities formed in the movable mold plate 18 as seen in FIGS. 6 and 7. Although the semi-conic cavities 24 are utilized to make a specific product it is to be understood that certain aspects of my invention may be utilized in forming devices such as worms or grubs wherein a conic cavity is not required. In this embodiment, the mold cavities 24 open laterally of the mold plates 11 and 18, as may best be seen in FIGS. 4, 5 and 9, and are formed in opposed pairs with each cavity in the pair opening on the opposite side of the mold plates. A short substantially cylindrical cavity 26 is formed intermediate the semi-conic mold cavities 24 of each pair and intersects a plastic delivery channel 27 formed in the stationary mold plate 11. The plastic delivery channel 27 is in fluid connection with conduit member 14 and includes an innermost recessed portion 28 and an outer recessed portion 29, as shown in FIG. 6, which is wider and longer than the innermost recessed portion 28. In actual practice, the portion 28 may be formed using a 5/16 inch ball mill and portion 29 may be 0.375 inches wide and 0.400 inches deep, and the cylindrical cavity 26 may be 0.250 inches in diameter. The outer portion 29 receives therein a stripper bar 31 which must fit securely and exactly therein. The stripper bar 31 has a plurality of semi-cylindrical regions 32 milled therein to mate with the cylindrical cavity 26, as best illustrated in FIG. 8, thus proper alignment of the stripper bar 31 is imperative. The stripper bar 31 also has a series of apertures 33 therethrough providing the only communication between the channel 28 and the interior of the mold cavity. A handle 34 is attached to stripper bar 31 and fits within a recess 36 of movable mold plate 18.

FIGS. 6–9 show that a plurality of annularly and equidistantly spaced grooves 37 are formed in the surfaces of the semi-conic mold cavities 24, the cylindrical cavity 26, and the semi-cylindric region 32 of the stripper bar 31. These grooves 37 extend from the center of the mold plates 11 and 18 outwardly toward the openings of the mold cavities and terminate within the mold. It should be noted that the grooves 37 in the stripper bar 31 align with the grooves 37 in the mold plate 11.

In FIGS. 1–5 and 9, it can be seen that a plurality of cones 41 are provided, with each cone 41 affixed to a spindle 42 and each spindle 42 slidably inserted in an aperture 43 passing through a side bar 44. Each spindle 42 passes through a spring 46 mounted between the cone 41 and the side bar 44 such that the cone 41 is urged away from the side bar 44. A fastener 45 or nut engages the spindle 42 at the end thereof opposite the cone 41 on the opposite side of the side bar 44 such that the cone 41 and spindle 42 are retained in the side bar 44. As best seen in FIG. 2, each side bar 44 is aligned with the junction of plates 11 and 18 and holds each spindle 42 and cone 41 in alignment with a mold cavity 24. As seen in FIGS. 1–3 each side bar 42 is connected to a linear actuator 47 which urges the side bar 44 and hence the cones 41 laterally. Note that the side bar 44 has feet 48 slidably resting on the support 12 which assist in maintaining alignment with the mold plate during lateral movement of the side bar 44.

The cones 41 are paired in opposition on side bar 44 on either side of the mold plate with one cone of each pair being a male cone 41m and the other a female cone 41f, the cones 41m carrying a 3/32 inch diameter pin 49 which passes through the cylindrical cavity 26 and engages the cone 41f. As may be seen, the cavity 26 is about 0.250 inches in diameter, therefore an annular space is created between the pin 49 and the walls of the cavity 26 and stripper plate 31. The cones 41m & f are sized such that they seal the outer portion of the conical cavities 24 at 50 outwardly of the grooves 37 and abut against the surface of the mold cavity intermediate the grooves 37.

In operation, the stripper bar 31 is positioned in the outer recess 29 of the distribution channel and the surface of the mold cavity is sprayed with a release agent such as silicone. Linear actuator 19 is actuated to close the mold assembly such that plate 18 is urged against mold plate 11. The side bar actuators 47 are operated to advance the side bars 44 and cones 41m & f toward the mold cavities. Note that the resilient biasing action of the springs 46 insures that each cone 41 positively seats in each conic cavity 24, thus the cavities are all sealed laterally and the mold apparatus forms a cavity that is comprised of a tube formed by the annular space about pin 49 in communication with the grooves 37. Heated plastic is injected into the cavity and cured as is conventional. After curing the cones 41m & f are retracted by the linear actuator 47 and the movable mold plate 18 is retracted through the action of actuator 19. The stripper bar 31 is grasped by handle 34 and removed from the mold apparatus, bringing with it the molded articles on one side and a sprue of plastic formed in the channel 28. The sprue is then stripped from the bar 31 by simply pulling it from the bar 31 which separates the sprue from the articles, whereupon the articles drop from the bar 31. The injection conduit 14 entrance to the channel 28 is cleared of cured plastic and the process is repeated. The resultant articles are plastic skirts as shown in FIG. 10, that is to say, a unitized plastic tubular member having a central tubular section and opposing sets of annularly spaced strands extending longitudinally from the central tubular section. Obviously, conventional molding apparatus and techniques could not manufacture such an article in as much as the plastic cannot be injected from one end of the article but rather must be injected at the center of the article, a process which is only possible using my unique stripper bar 31 which separates the sprue from the plastic article. It will further be appreciated that I can utilize the same type stripper bar to form other lures or I can use more than one stripper bar to simultaneously inject plastic of different characteristics into the same mold, i.e. I can inject plastic of different colors into the mold at the same time using separate distribution channels and stripper bars to feed the same cavity from different points.

Figure 11:
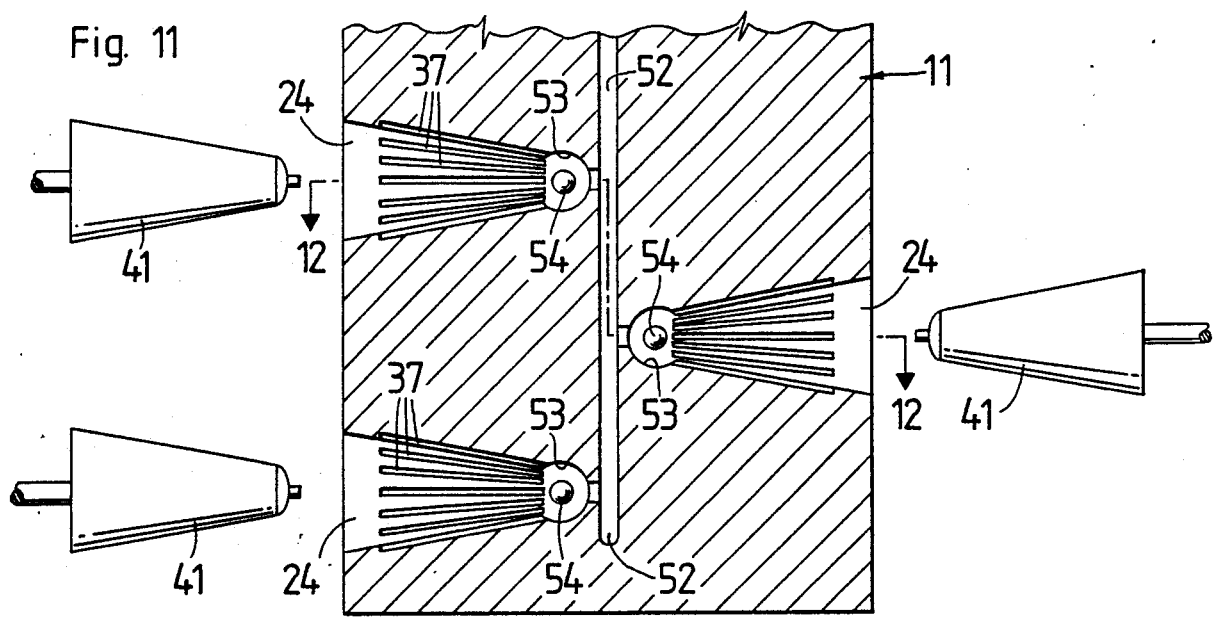
FIG. 11 is an elevational view of a second embodiment.
Figure 12:
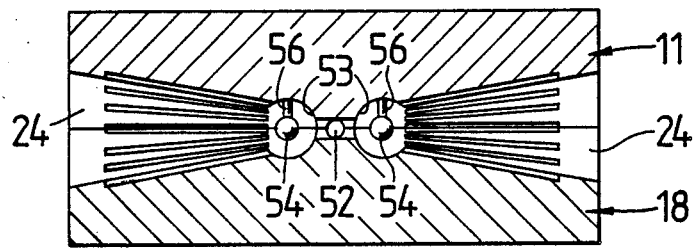
FIG. 12 is a sectional view taken along line 12—12 of FIG. 11.
Figure 13:
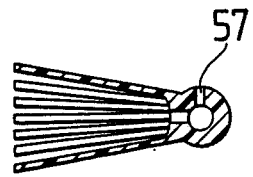
FIG. 13 is a sectional view of the product of the molds shown in FIGS. 11 and 12.
Figure 14:
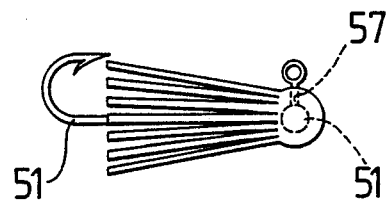
FIG. 14 is a side elevational view of the product on a jig.

In another embodiment it is desirable to provide a jig skirt which will fit over the head of a jig 51 as shown in FIG. 14. The apparatus depicted in FIGS. 11 and 12 can be used to form the article shown in FIG. 13. As will be noted in FIG. 11, the liquid plastic is delivered to the mold cavities 24 in a conventional manner in this embodiment. In other words, the plastic distribution channel 52 delivers plastic at one end of the mold cavity 24. Instead of having a double skirt forming mold, in this embodiment a somewhat spherical region 53 is formed in the mold plates 11 and 18 in communication with the conic cavity 24 and the distribution channel 52. The grooves 37 are formed about the conic cavity 24 and terminate in the spherical region 53. Cones 41 are utilized in the same manner as in the previous embodiment, however, instead of having male and female cones, all of the cones are adapted to engage a preform 54 which may be in the form of a ball or a jig head and which is concentrically mounted within the spherical region 53 as with a spacer 56. The operational characteristics of the present embodiment are the same as previously discussed, however, no stripper bar is used. Thus the individual articles must be picked from the sprue. Note that the spacer 56 provides an exit aperture 57 for the preform 54 which also permits insertion of the jig 51 into the skirt without tearing or puncturing the plastic, thus the skirt retains its structural integrity in use. It is ostensibly noteworthy to mention that the prior art skirts has no such aperture and thus the skirt could not be replaced on the jig by a fresh skirt without untying the jig from the fishing line. With my skirts the jig is inserted hook first through the aperture 57 so that the eye of the jig may remain attached to the line.

While I have shown my invention in two forms, it will be obvious to those skilled in the art that it is not so limited but is susceptible of various changes and modifications without departing from the spirit thereof.

What I claim is:

1. Apparatus for injection molding of plastic articles using pressurized heated plastic from a defined source comprising in combination with said source:
    (a) fixed mold plate having a first plurality of molding cavities formed therein in a linear array and a groove formed therein intermediate said cavities, said groove intersecting said cavities proximal the middle of each cavity and communicating with said source;
    (b) a movable mold plate hingedly affixed to said fixed mold plate for selective relative movement to an abutting position and a displaced position, said movable mold plate having a second plurality of molding cavities formed therein for cooperative alignment with said first plurality of molding cavities to form a plurality of paired abutting cavities; and
    (c) a strip-like member removably placed in sealing relationship in said groove separating said groove from said cavities and having a plurality of apertures cooperatively spaced to provide individual communication between each pair of said plurality of abutting pairs of cavities and said groove.

2. Apparatus as defined in claim 1 wherein each pair of cavities extends perpendicular to said groove and forms at least one laterally opening conic mold between said groove and a lateral edge of said mold plate, with each conic mold having a plurality of equally spaced, linear channels formed therein and communicating with said groove; and further comprising a plurality of conic inserts each adapted for insertion into said paired abutting cavities between said fixed and hinged mold plate when in said abutting position to seal the lateral opening of said mold.

3. Apparatus as defined in claim 2 further comprising a carrier bar extending parallel to said groove and supporting each of said conic inserts on individual spindles aligned with said conic molds; a spring mounted on each spindle intermediate said carrier bar and said conic insert and urging said conic insert toward said conic mold; and means for selectively urging said carrier bar laterally to register and retract said conic inserts relative to said conic molds.

4. An apparatus for forming plastic articles by injection of heated plastic from a source thereof into a reusable mold, comprising:
    (a) a fixed mold plate having at least one elongated distribution channel intersecting a plurality of mold cavities formed therein; and movable mold plate having a plurality of mold cavities formed therein for cooperative abutment against said fixed mold plate to form a series of spaced apart molds interconnected by said distribution channel; and a bar member removably inserted in said distribution channel to separate said distribution channel from said molds, with said bar member having an aperture therethrough adjacent each mold in said series providing communication between said distribution channel and each mold.

5. Apparatus as defined in claim 4 wherein each mold extends laterally on either side of said distribution channel.

6. Apparatus as defined in claim 5 wherein said mold defines a conic surface diverging laterally on either side of said distribution channel and extending to an outer edge of said mold plate, said conic surface having a plurality of circumferentially spaced mold grooves formed therein in communication with said distribution channel with each groove having a terminus inwardly of said edge of said mold plate, and further comprising conic insert means having a smooth outer surface and adapted for selective insertion into each mold in abutting relationship with said conic surface.

7. Apparatus as defined in claim 6 wherein said conic surfaces are aligned in opposing pairs and are connected by a tubular section adjacent and communicating with said distribution channel and wherein said conic insert means includes at least one pair of conical members configured for abutment against said conical surfaces aligned in opposing pairs including a male and female conical member, said male member having a rod-like extension at the apex thereof engagable with said female member at the apex thereof through said tubular section when said smooth outer surface abuts said conical surface, with said conic insert means and said mold plates cooperatively defining a region wherein said plastic may be injected including an annular chamber proximal said bar member and a plurality of annularly spaced elongated regions extending longitudinally of and diverging from the axis of said annular region.

8. Apparatus as defined in claim 7 wherein said conic insert means further comprises:
    (a) a carrier bar mounted laterally of said mold plates for selective movement toward and away from said mold plates;
    (b) a plurality of spindles extending from said carrier bar and aligned with said molds and each slidably supporting said conical members thereon;
    (c) a spring member concentrically mounted on said each spindle of said plurality of spindles intermediate said carrier bar and said conical member and urging said conical member toward said mold.

9. Apparatus as defined in claim 6 wherein said conic insert means further comprises:
    (a) a carrier bar mounted laterally of said mold plates for selective movement toward and away from said mold plates;

(b) a plurality of spindles extending from said carrier bar and aligned with said molds and each slidably supporting said conical members thereon;

(c) a spring member concentrically mounted on said each spindle of said plurality of spindles intermediate said carrier bar and said conical member and urging said conical member toward said mold.

10. Apparatus for forming plastic articles by injection of the heated plastic from a source thereof into a reusable mold, comprising:

(a) a first mold plate having a plurality of mold recesses formed thereon for selective communication with said source, each recess being semi-conical and tapering inwardly from one side of said mold plate;

(b) a second mold plate mounted for selective movement into abutting relationship with said first mold plate and having a plurality of mold recesses formed therein for cooperative registration with the plurality of mold recesses formed in said first plate such that laterally opening conic molds are formed in said mold plate;

(c) a plurality of cones mounted for selective movement into said conic molds to laterally seal said molds, each of said cones having a smooth outer surface and each of said molds having a plurality of axial grooves for receiving heated plastic therein; and (d) a plastic delivery channel formed in said first mold plate in communication with said source and in communication with each mold recess thereon and a sealing strip removably inserted in said plastic delivery channel to separate said mold recesses from the plastic delivery channel and sealing said channel along the length thereof, said strip having a plurality of apertures, each aperture thereof aligned with the mold recess, with each aperture providing communication between said plastic delivery channel and said recess.

11. Apparatus as defined in claim 10 further comprising a semi-cylindrical surface formed in each of said mold plates adjacent each of said mold recesses and defining an inner extension of each of said mold recesses.

12. Apparatus as defined in claim 11 further comprising a preform mounted concentrically with said semi-cylindrical surface and spaced therefrom, with said preform adapted for cooperative engagement with the said cone upon insertion of said cone into said molds; and means for supporting said preform from said first mold plate, such that said preform forms a jig receiving cavity within a plastic article formed therewith.

13. Apparatus as defined in claim 12 wherein said preform is a sphere and said means for supporting is a pin connecting said sphere to said semi-cylindrical surface such that said pin forms an aperture in the plastic article formed therein to permit insertion of an eye socket on said jig without puncturing or tearing the plastic, whereby said eye socket extends through the aperture perpendicular to the longitudinal axis of the jig.

14. Apparatus as defined in clam 12 further comprising a mounting bar for supporting said plurality of cones, said mounting bar aligned with said mold plates and having a plurality of spindles aligned with said molds, each spindle of said plurality of spindles slidably supporting thereon one cone of said plurality of cones and supports thereon means for urging said cone toward said mold plates.

* * * * *